(12) United States Patent
Jeon et al.

(10) Patent No.: US 9,900,731 B2
(45) Date of Patent: Feb. 20, 2018

(54) METHOD OF PROVIDING LOCATION BASED SERVICE AND ELECTRONIC DEVICE THEREOF

(71) Applicant: Samsung Electronics Co., Ltd., Suwon-si, Gyeonggi-do (KR)

(72) Inventors: Yong-Joon Jeon, Hwaseong-si (KR); Seung-Soo Woo, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/247,718

(22) Filed: Apr. 8, 2014

(65) Prior Publication Data

US 2015/0018012 A1  Jan. 15, 2015

(30) Foreign Application Priority Data

Jul. 15, 2013  (KR) .................. 10-2013-0082727

(51) Int. Cl.
*H04W 4/02* (2009.01)
*H04M 1/725* (2006.01)

(52) U.S. Cl.
CPC ......... *H04W 4/02* (2013.01); *H04M 1/72572* (2013.01)

(58) Field of Classification Search
CPC ......... H04W 4/02; H04W 4/18; H04W 4/001; H04W 64/00; H04W 8/18; H04W 4/021; H04W 4/22; H04W 4/003; H04W 4/206; H04W 4/023; H04L 67/16
See application file for complete search history.

(56) References Cited

U.S. PATENT DOCUMENTS

| | | | |
|---|---|---|---|
| 2009/0170532 A1 | 7/2009 | Lee et al. | |
| 2011/0207449 A1 | 8/2011 | Shin et al. | |
| 2011/0230209 A1 | 9/2011 | Kilian | |
| 2012/0284256 A1* | 11/2012 | Mahajan | G06F 17/3087 707/722 |
| 2012/0289147 A1* | 11/2012 | Raleigh et al. | 455/3.06 |
| 2012/0309407 A1 | 12/2012 | Cazier et al. | |
| 2013/0246220 A1* | 9/2013 | Hammad et al. | 705/26.9 |
| 2013/0325856 A1* | 12/2013 | Soto Matamala | G06F 17/3087 707/724 |
| 2014/0143791 A1* | 5/2014 | Mark | G06F 9/485 719/318 |
| 2014/0171052 A1* | 6/2014 | LaMarca | H04W 4/02 455/418 |
| 2014/0253320 A1* | 9/2014 | Bender | H04M 1/72566 340/521 |

FOREIGN PATENT DOCUMENTS

| | | |
|---|---|---|
| EP | 2 447 809 A2 | 5/2012 |
| JP | 2002-314642 A | 10/2002 |
| KR | 10-2005-0022136 A | 3/2005 |
| WO | 2009/012522 A1 | 1/2009 |

* cited by examiner

*Primary Examiner* — Liton Miah
(74) *Attorney, Agent, or Firm* — Jefferson IP Law, LLP

(57) ABSTRACT

A method and an apparatus for providing a location based service in an electronic device are provided. The method includes classifying location information of the electronic device having a similar characteristic into a category and mapping an operation of the electronic device according to the category.

14 Claims, 8 Drawing Sheets

METHOD OF PROVIDING LOCATION BASED SERVICE AND ELECTRONIC DEVICE THEREOF

CROSS-REFERENCE TO RELATED APPLICATION(S)

This application claims the benefit under 35 U.S.C. § 119(a) of a Korean patent application filed on Jul. 15, 2013 in the Korean Intellectual Property Office and assigned Serial number 10-2013-0082727, the entire disclosure of which is hereby incorporated by reference.

TECHNICAL FIELD

The present disclosure relates to a method for providing a location based service and an electronic device thereof. More particularly, the present disclosure relates to a method and an apparatus for performing an operation according to a category including location information of an electronic device in the electronic device.

BACKGROUND

With advancement of communication technologies, portable electronic devices have evolved into multimedia devices for providing various multimedia services using a data communication service as well as a voice call service. In addition, electronic devices may provide various functions, such as a camera function, an Internet function, a Moving Picture Experts Group (MPEG-1 or MPEG-2) Audio Layer 3 (MP3) player function, a scheduling function, an alarm function, and the like.

In general, the alarm function provided from electronic devices may include a function for informing events, such as a wake-up call, a schedule, a thing to do at a time designated by a user of the electronic device, and the like. The electronic device may perform a notification function based on location information as well as time. For example, the electronic device may detect its current location. When there is an operation mapped to the detected current location, the electronic device may perform the mapped operation.

As described above, in order to provide the notification function based on the location information, there is an inconvenience in that the electronic device needs to have previously performed a process of setting the location information and a process of setting an event in the location information by the user.

In addition, there is an inconvenience in that the electronic device needs to perform alarm settings for location information having a similar characteristic again by providing a notification event in location information which is set by the user.

Therefore, a need exists for an improved method for providing a location based notification service in an electronic device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for performing an operation according to a category including location information of an electronic device in the electronic device.

Another aspect of the present disclosure is to provide a method and an apparatus for performing the latest performed operation when operations mapped to a category are a plurality of operations in an electronic device.

Another aspect of the present disclosure is to provide a method and an apparatus for mapping an operation to a category including location information of an electronic device at a time point of performing the operation in an electronic device.

Another aspect of the present disclosure is to provide a method and an apparatus for mapping an operation to a category based on a number of times the operation is performed in the same category in an electronic device.

Another aspect of the present disclosure is to provide a method and an apparatus for mapping an operation to a category based on a number of times the operation is performed in the same category during a reference time in an electronic device.

In accordance with an aspect of the present disclosure, a method for providing a location based service in an electronic device is provided. The method includes classifying location information of the electronic device having a similar characteristic into a category and mapping an operation of the electronic device according to the category.

In accordance with another aspect of the present disclosure, a method for providing a location based service in an electronic device is provided. The method includes detecting location information of the electronic device, determining a category including the location information of the electronic device, determining an operation of the electronic device, which is mapped to the category, and performing the operation of the electronic device.

In accordance with another aspect of the present disclosure, a method for providing a location based service in an electronic device is provided. The method includes detecting location information of the electronic device when the electronic device performs a first operation, determining a category including the location information of the electronic device, and mapping the first operation of the category.

In accordance with another aspect of the present disclosure, an electronic device is provided. The electronic device includes a memory, and at least one processor configured to classify location information of the electronic device having a similar characteristic into a category and map an operation of the electronic device according to the category.

In accordance with another aspect of the present disclosure, an electronic device is provided. The electronic device includes a memory, and at least one processor configured to detect location information of the electronic device, determine a category including the location information of the electronic device, determine an operation of the electronic device mapped to the category, and perform the operation.

In accordance with another aspect of the present disclosure, an electronic device is provided. The electronic device includes a memory, and at least one processor configured to detect location information of the electronic device when performing a first operation, determine a category including the location information of the electronic device, and map the first operation to the category.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Hereinafter, a description will be given for a method and an apparatus for providing a location based service in an electronic device.

Hereinafter, it is assumed that a category includes a plurality of location information having a similar characteristic. For example, the category may be classified according to a type of business, such as movie theaters, drugstores, gas stations, and the like.

Hereinafter, the electronic device may be any one of a mobile communication terminal, a Personal Digital Assistant (PDA), a Personal Computer (PC), a laptop, a smart phone, a netbook, a TeleVision (TV), a Mobile Internet Device (MID), an Ultra Mobile Personal Computer (UMPC), a tablet PC, a navigation device, a smart TV, a Moving Picture Experts Group (MPEG-1 or MPEG-2) Audio Layer 3 (MP3) player, and the like.

Figure 1:
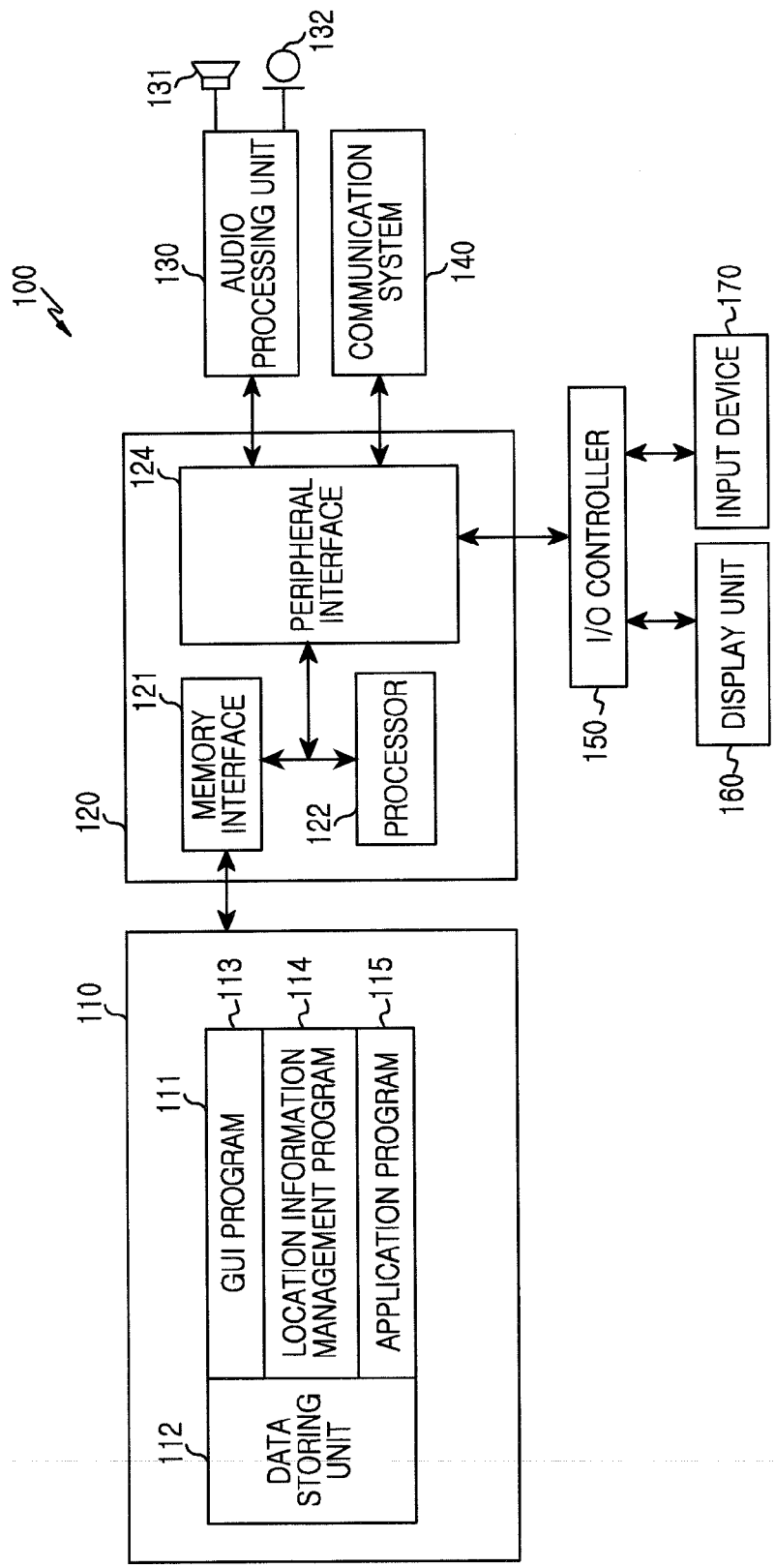
FIG. 1 is a block diagram illustrating a configuration of an electronic device according to an embodiment of the present disclosure.

FIG. 1 is a block diagram illustrating a configuration of an electronic device according to an embodiment of the present disclosure.

Referring to FIG. 1, an electronic device 100 may include a memory 110, a processor 120, an audio processing unit 130, a communication system 140, an Input/Output (I/O) controller 150, a display unit 160, and an input device 170. Herein, the memory 110 may be a plurality of memories.

A description will be given for respective components as follows.

The memory 110 may include a program storing unit 111 for storing programs for controlling operations of the electronic device 100 and a data storing unit 112 for storing data generated while the programs are executed. For example, the data storing unit 112 stores map data needed to determine a category including location information in a location information management program 114.

The program storing unit 111 may include a Graphical User Interface (GUI) program 113, the location information management program 114, and an application program 115. Herein, the programs included in the program storing unit 111 may be expressed in an instruction set as a set of instructions.

The GUI program 113 may include a software component for providing a UI as graphics on the display unit 160. For example, the GUI program 113 may include an instruction for displaying information of an application program executed by the location information management program 114 on the display unit 160.

The location information management program 114 may include a software component for mapping an operation to a category including location information. For example, when the electronic device 100 performs an operation, the location information management program 114 detects location information of the electronic device 100. After detecting the location information of the electronic device 100, the location information management program 114 determines a category including the location information. Thereafter, the location information management program 114 maps the operation to the category. Herein, the location information management program 114 may determine the category including the location information at a time point of performing the operation and determine the number of times the same operation is performed in the category. Accordingly, when the number of times the same operation is performed in the category is greater than or equal to the reference number of times, the location information management program 114 may map the operation to the category.

In addition, the location information management program 114 may determine the category including the location information at the time point of performing the operation and determine the number of times the same operation is performed in the category during a reference period. Accordingly, when the number of times the same operation is performed in the category during the reference period is greater than or equal to the reference number of times, the location information management program 114 may map the operation to the category. Moreover, when there is a second operation which is previously mapped to the category, the location information management program 114 may compare the number of times a first operation is performed in the category with the number of times the second operation is performed in the category and map the most performed operation to the category.

The location information management program 114 may include a software component for performing an operation mapped to a category. For example, the location information management program 114 detects location information of the electronic device 100. After detecting the location information of the electronic device 100, the location information management program 114 determines a category including the detected location information of the electronic device. After determining the category including the location information, the location information management program 114 determines an operation mapped to the category. Thereafter, the location information management program 114 performs the operation mapped to the category. Herein, when the operation mapped to the category is a plurality of operations, the location information management program 114 may perform an operation recently performed in the category among the plurality of operations. Moreover, when the operation mapped to the category is a plurality of operations, the location information management program 114 may perform an operation having the most number of times the operation is performed in the category among the plurality of operations. Further, when the operation mapped to the category is a plurality of operations, the location information management program 114 may perform an operation having the most number of times the operation is performed in the category during a reference period among the plurality of operations.

In addition, when there is no category including the location information, the location information management program 114 may determine any one category to include the location information by an operation of the user. The location information management program 114 may generate a new category including the location information by an operation of the user. In addition, although there is a category including the location information, the location information management program 114 may change the category to a different category to include the location information to the different category.

The application program 115 includes a software component for an application program installed in the electronic device 100.

The processor 120 may include a memory interface 121, a processor 122, and a peripheral interface 124. Herein, the memory interface 121, the processor 122, and the peripheral interface 124 which are included in the processor 120 may be integrated in at least one Integrated Circuit (IC) or may be separately implemented.

The memory interface 121 controls that a component, such as the processor 122 or the peripheral interface 124, accesses the memory 110.

The peripheral interface 124 controls a connection among an I/O peripheral of the electronic device 100, the processor 122, and the memory interface 121.

The processor 122 provides a variety of multimedia services using a software program. In addition, the processor 122 executes a program stored in the memory 110 and provides a service according to the corresponding program.

The audio processing unit 130 provides an audio interface between the user and the electronic device 100 through a speaker 131 and a microphone 132.

The communication system 140 performs a communication function for voice and data communication. Herein, the communication system 140 may be classified into a plurality of communication sub-modules which support different communication networks. For example, the communication network may be, but is not limited to, any one of a Global System for Mobile communication (GSM) network, an Enhanced Data GSM Environment (EDGE) network, a Code Division Multiple Access (CDMA) network, a W-CDMA network, a Long Term Evolution (LTE) network, an Orthogonal Frequency Division Multiple Access (OFDMA) network, a wireless Local Area Network (LAN), a Bluetooth network, a Near Field Communication (NFC) network, and the like.

The I/O controller 150 provides an interface between I/O devices, such as the display device 160 and the input device 170, and the peripheral interface 124.

The display unit 160 displays state information of the electronic device 100, characters input by the user, moving pictures, still pictures, and the like. For example, the display unit 160 displays information of an application program executed by the processor 122.

The input device 170 provides input data generated by selection of the user to the processor 120 through the I/O controller 150. Herein, the input device 170 may include a keypad including a hardware button, a touchpad for detecting touch information, and the like. For example, the input device 170 may provide the touch information detected through the touchpad to the processor 122 through the I/O controller 150.

Figure 2:
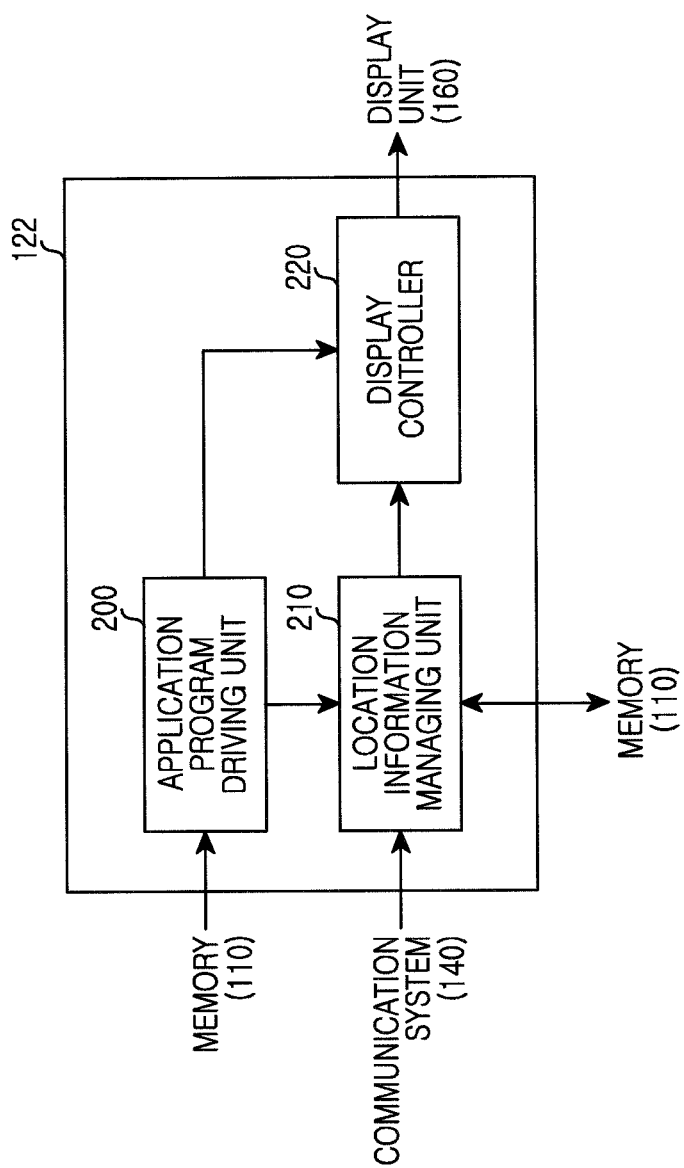
FIG. 2 is a block diagram illustrating a configuration of a processor according to an embodiment of the present disclosure.

FIG. 2 is a block diagram illustrating a configuration of a processor according to an embodiment of the present disclosure.

Referring to FIGS. 1 and 2, the processor 122 includes an application program driving unit 200, a location information managing unit 210, and a display controller 220.

The application program driving unit 200 executes the application program 115 stored in the program storing unit 111 and provides a service according to the corresponding application program. For example, the application program driving unit 200 executes an application program by the location information managing unit 210.

The location information managing unit 210 executes the location information management program 114 stored in the program storing unit 111 and maps an operation to a category including location information. For example, when the electronic device 100 performs an operation, the location information managing unit 210 detects location information of the electronic device 100. After detecting the location information of the electronic device 100, the location information managing unit 210 determines a category including the location information. Thereafter, the location information managing unit 210 maps the operation to the category. Herein, the location information managing unit 210 may determine the category including the location information at a time point of performing the operation and determine the number of times the same operation is performed in the category. Accordingly, when the number of times the same operation is performed in the category is greater than or equal to the reference number of times, the location information managing unit 210 may map the operation to the category.

In addition, the location information managing unit 210 may determine the category including the location information at the time point of performing the operation and determine the number of times the same operation is performed in the category during a reference period. Accordingly, when the number of times the same operation is performed in the category during the reference period is greater than or equal to the reference number of times, the location information managing unit 210 may map the operation to the category. When there is a second operation which is previously mapped to the category, the location information managing unit 210 may compare the number of times a first operation is performed in the category with the number of times the second operation is performed in the category and map the most performed operation to the category.

The location information managing unit 210 executes the location information management program 114 stored in the program storing unit 111 and performs an operation mapped to a category. For example, the location information managing unit 210 detects location information of the electronic device 100. After detecting the location information of the electronic device 100, the location information managing unit 210 determines a category including the detected location information of the electronic device. After determining the category including the location information, the location information managing unit 210 determines an operation mapped to the category. Thereafter, the location information managing unit 210 performs the operation mapped to the category. Herein, when the operation mapped to the category is a plurality of operations, the location information managing unit 210 may perform an operation recently performed in the category among the plurality of operations. In addition, when the operation mapped to the category is a plurality of operations, the location information managing unit 210 may perform an operation having the most number of times the operation is performed in the category among the plurality of operations. Further, when the operation mapped to the category is a plurality of operations, the location information managing unit 210 may perform an operation having the most number of times the operation is performed in the category during a reference period among the plurality of operations.

In addition, when there is no category including the location information, the location information managing unit 210 may determine any one category to include the location information by an operation of a user. In addition, the location information managing unit 210 may generate a new category including the location information by an operation of the user. In addition, although there is a category including the location information, the location information managing unit 210 may change the category to a different category to include the location information to the different category.

The display controller 220 executes the GUI program 113 stored in the program storing unit 111 and controls the display unit 160 to display a UI as graphics on the display unit 150. For example, the display controller 220 controls the display unit 160 to display information of an application program executed by the location information managing unit 210 on the display unit 160.

In an embodiment of the present disclosure, the electronic device 100 provides the location based service using the processor 122 including the location information managing unit 210.

In another embodiment of the present disclosure, the electronic device 100 may include a separate location based service control module for providing a location based service.

Figure 3A:
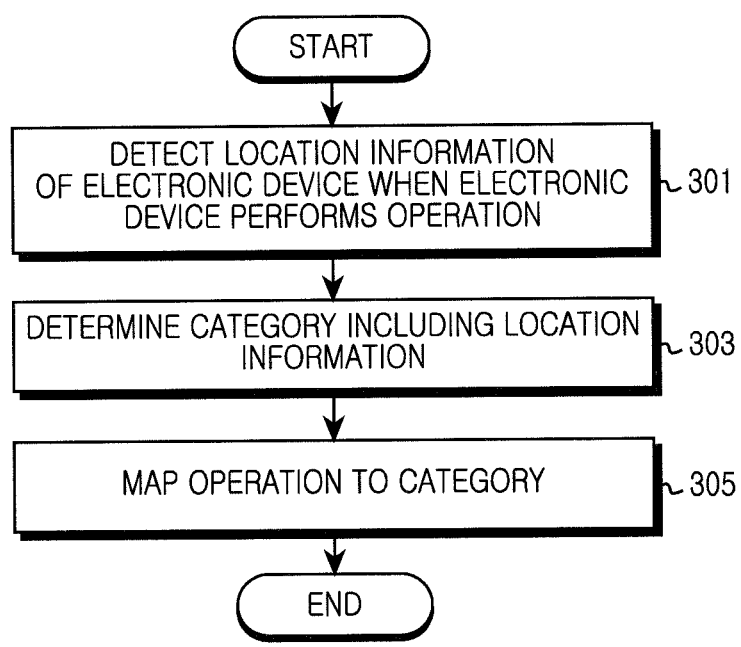
FIG. 3A is a flowchart illustrating a process of mapping an operation to a category including location information in an electronic device according to an embodiment of the present disclosure.

FIG. 3A is a flowchart illustrating a process of mapping an operation to a category including location information in an electronic device according to an embodiment of the present disclosure.

Referring to FIG. 3A, upon the electronic device performing an operation, the electronic device detects its location information in operation 301. Herein, the operation may include all operations, which may be performed in the electronic device, such as control settings of the electronic device, execution of application programs, an initial mode when an application program is executed, and the like. For example, in the process of setting an "airplane mode", the electronic device determines its current location information using a Global Positioning System (GPS). Herein, it is assumed that the "airplane mode" is a mode for changing a bell sound mode of the electronic device to a vibration mode and automatically rejecting a received call. In another example, in the process of driving a "car keeping book", the electronic device may determine its current location information using the GPS. Herein, it is assumed that the "car keeping book" is a car management application program.

After detecting the location information of the electronic device, the electronic device proceeds to operation 303 and determines a category including the location information. Herein, it is assumed that the category includes a plurality of location information having a similar characteristic. For example, when location information at a time point of setting the "airplane mode" is a "CGG cinema", the electronic device may determine that a category of the "CGG cinema" is a "movie theater" using map data stored in a data storing unit. In another example, when location information at a time point of driving the "car keeping book" is an "ABC gas station", the electronic device may determine that a category of the "ABC gas station" is a "gas station" using map data stored in the data storing unit. In addition, when there is no category including the location information, the electronic device may determine any one category to include the location information by an operation of a user of the electronic device. In addition, the electronic device may generate a new category including the location information by an operation of the user. In addition, although there is a category including the location information, the electronic device may change the category to a different category to include the location information in the different category.

After determining the category including the location information, the electronic device proceeds to operation 305 and maps an operation to the category. For example, the electronic device maps setting information of the "airplane mode" to the "movie theater" category. Thereafter, if location information of the electronic device corresponding to the "movie theater" category is detected, the electronic device stores the detected location information in the data storing unit to set the "airplane mode" automatically. In another example, the electronic device maps driving information of the "car keeping book" to the "gas station" category. Thereafter, if location information of the electronic device corresponding to the "gas station" category is detected, the electronic device may store the detected location information in the data storing unit to drive the "car keeping book" automatically.

In addition, the electronic device may determine a category including location information at a time point of performing an operation and determine the number of times the same operation is performed in the category. Accordingly, when the number of times the same operation is performed in the category is greater than or equal to the reference number of times, the electronic device may map an operation to the category.

In addition, the electronic device may determine a category including location information at a time point of performing an operation and determine the number of times the same operation is performed in the category during a reference period. Accordingly, when the number of times the same operation is performed in the category during the reference period is greater than or equal to the reference period, the electronic device may map an operation to the category.

In addition, when there is a second operation previously mapped to a category, the electronic device may compare the number of times a first operation is performed in the category with the number of times the second operation is performed in the category and map the most performed operation to the category.

Therefore, the electronic device ends the algorithm of FIG. 3A.

Figure 3B:
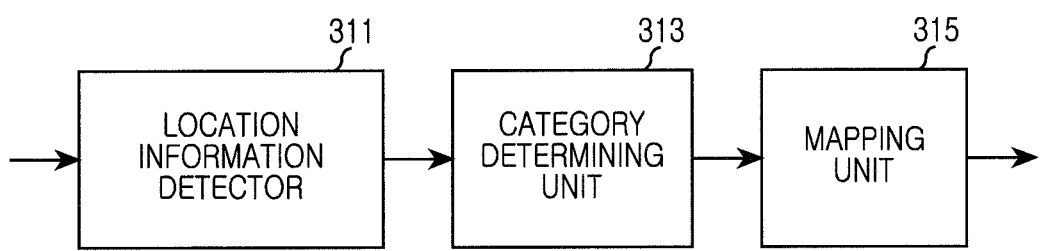
FIG. 3B is a block diagram illustrating a configuration of an electronic device for mapping an operation to a category including location information according to an embodiment of the present disclosure.

As described above, the process of providing the service based on the location in the electronic device may be configured as, as shown in FIG. 3B, an apparatus for providing the service based on the location in the electronic device.

FIG. 3B is a block diagram illustrating a configuration of an electronic device for mapping an operation to a category including location information according to an embodiment of the present disclosure.

Referring to FIG. 3B, the electronic device may include a location information detector, that is, a first unit 311 for detecting location information of the electronic device, a category determining unit, that is, a second unit 313 for determining a category including the location information, and a mapping unit, that is, a third unit 315 for mapping an operation to the category.

The first unit 311 detects location information of the electronic device. For example, in the process of setting an "airplane mode", the first unit 311 determines current location information of the electronic device using a GPS. Herein, it is assumed that the "airplane mode" is a mode for changing a bell sound mode of the electronic device to a vibration mode and automatically rejecting a received call. In another example, in the process of driving a "car keeping book", the first unit 311 may determine current location information of the electronic device using the GPS. Herein, it is assumed that the "car keeping book" is a car management application program.

The second unit 313 determines a category including the location information of the electronic device, which is detected in the first unit 311. Herein, it is assumed that the category includes a plurality of location information having a similar characteristic. For example, when location information at a time point of setting the "airplane mode" is a "CGG cinema", the second unit 313 may determine that a category of the "CGG cinema" is a "movie theater" using map data stored in a data storing unit. In another example, when location information at a time point of driving the "car keeping book" is an "ABC gas station", the second unit 313 may determine that a category of the "ABC gas station" is a "gas station" using map data stored in the data storing unit.

In addition, when there is no category including the location information, the second unit 313 may determine any one category to include the location information by an operation of a user of the electronic device. In addition, the second unit 313 may generate a new category including the location information by an operation of the user. In addition, although there is a category including the location information, the second unit 313 may change the category to a different category to include the location information in the different category.

The third unit 315 maps an operation to the category determined in the second unit 313. For example, the third unit 315 maps setting information of the "airplane mode" to the "movie theater" category. Thereafter, if location information of the electronic device corresponding to the "movie theater" category is detected, the third unit 315 stores the detected location information in the data storing unit to set the "airplane mode" automatically. In another example, the third unit 315 maps driving information of the "car keeping book" to the "gas station" category. Thereafter, if location information of the electronic device corresponding to the "gas station" category is detected, the third unit 315 may store the detected location information in the data storing unit to drive the "car keeping book" automatically.

In addition, the third unit 315 may determine a category including location information at a time point of performing an operation and determine the number of times the same operation is performed in the category. Accordingly, when the number of times the same operation is performed in the category is greater than or equal to the reference number of times, the third unit 315 may map an operation to the category.

In addition, the third unit 315 may determine a category including location information at a time point of performing an operation and determine the number of times the same operation is performed in the category during a reference period. Accordingly, when the number of times the same operation is performed in the category during the reference period is greater than or equal to the reference number of times, the electronic device may map an operation to the category.

In addition, when there is a second operation previously mapped to a category, the third unit 315 may compare the number of times a first operation is performed in the category with the number of times the second operation is performed in the category and map the most performed operation to the category.

As described above, the electronic device may include a plurality of units for providing the service based on the location. Herein, the plurality of units for providing the service based on the location in the electronic device may be configured as one unit.

Figure 4:
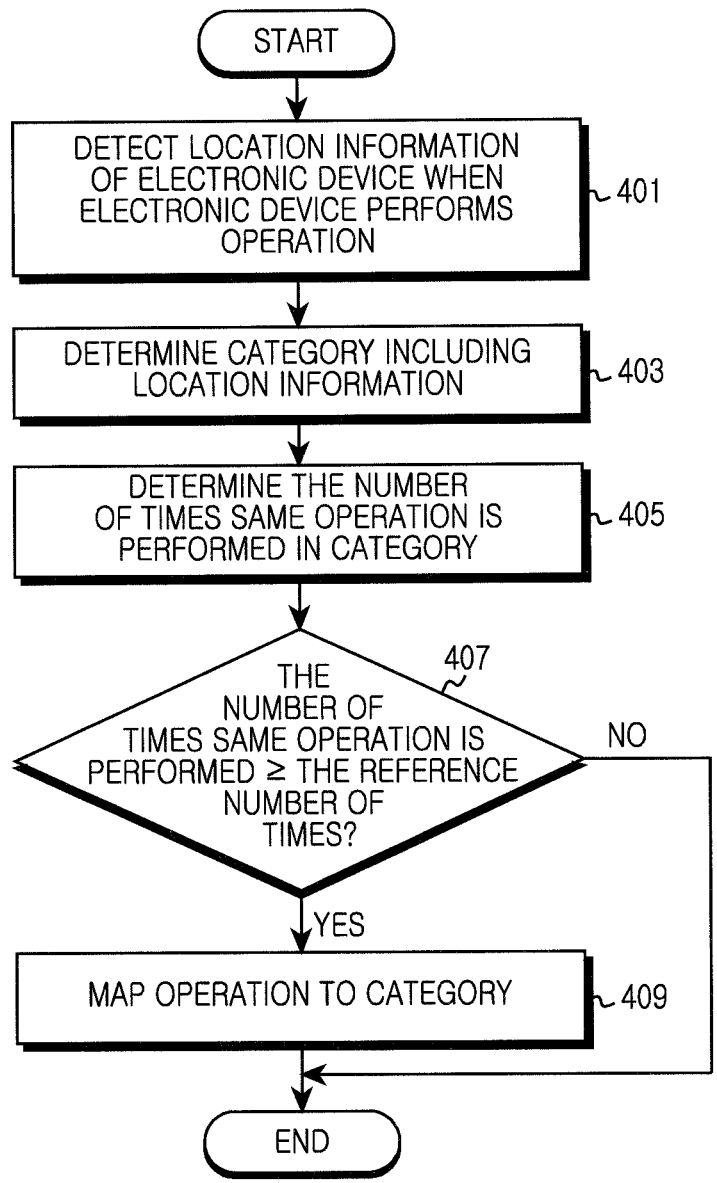
FIG. 4 is a flowchart illustrating a process of mapping an operation to a category based on a number of times the same operation is performed in the category in an electronic device according to an embodiment of the present disclosure.

FIG. 4 is a flowchart illustrating a process of mapping an operation to a category based on a number of times the same operation is performed in the category in an electronic device according to an embodiment of the present disclosure.

Referring to FIG. 4, upon the electronic device performing an operation, the electronic device detects its location information in operation 401. Herein, the operation may include all operations, which may be performed in the electronic device, such as control settings of the electronic device, execution of application programs, an initial mode when an application program is executed, and the like. For example, in the process of setting an "airplane mode", the electronic device determines its current location information using a GPS. Herein, it is assumed that the "airplane mode" is a mode for changing a bell sound mode of the electronic device to a vibration mode and automatically rejecting a received call. In another example, in the process of driving a "car keeping book", the electronic device may determine its current location information using the GPS. Herein, it is assumed that the "car keeping book" is a car management application program.

After detecting the location information of the electronic device, the electronic device proceeds to operation 403 and determines a category including the location information. Herein, it is assumed that the category includes a plurality of location information having a similar characteristic. For example, when location information at a time point of setting the "airplane mode" is a "CGG cinema", the electronic device may determine that a category of the "CGG cinema" is a "movie theater" using map data stored in a data storing unit. In another example, when location information at a time point of driving the "car keeping book" is an "ABC gas station", the electronic device may determine that a category of the "ABC gas station" is a "gas station" using map data stored in the data storing unit. In addition, when there is no category including the location information, the electronic device may determine any one category to include the location information by an operation of a user of the electronic device. In addition, the electronic device may generate a new category including the location information by an operation of the user. In addition, although there is a category including the location information, the electronic device may change the category to a different category to include the location information in the different category.

After determining the category including the location information, the electronic device proceeds to operation 405 and determines the number of times the same operation is performed in the category determined in operation 403. For example, the electronic device determines the number of times of setting the "airplane mode" in a "movie theater". In another example, the electronic device may determine the number of times of driving the "car keeping book" in a "gas station". Herein, it is assumed that the number of times the operation is performed is stored in the data storing unit.

After determining the number of times the same operation is performed, the electronic device proceeds to operation 407 and determines that the number of times the same operation is performed in the category is greater than or equal to the reference number of times. If it is determined in operation 407 that the number of times the same operation is performed in the category is less than the reference number of times, the electronic device ends the algorithm of FIG. 4. For example, when the number of times of setting the "airplane mode" in the "movie theater" is less than the reference number of times, the electronic device recognizes that it is needed to determine whether to set the "airplane mode" in the "movie theater" at least once or more. In another example, when the number of times of driving the "car keeping book" in the "gas station" is less than the reference number of times, the electronic device may recognize that it is needed to determine whether to drive the "car keeping book" in the "gas station" at least once more.

On the other hand, if it is determined in operation 407 that the number of times the same operation is performed in the category is greater than or equal to the reference number of times, the electronic device proceeds to operation 409 and maps an operation to the category. For example, when the number of times of setting the "airplane mode" in the "movie theater" is greater than or equal to the reference number of times, the electronic device recognizes that the "airplane mode" is set in the "movie theater". Accordingly, the electronic device maps setting information of the "airplane mode" to the "movie theater" category. Thereafter, if location information of the electronic device corresponding to the "movie theater" category is detected, the electronic device stores the detected location information in the data storing unit to set the "airplane mode" automatically. In another example, when the number of times of driving the "car keeping book" in the "gas station" is greater than or equal to the reference number of times, the electronic device recognizes that the "car keeping book" is driven in the "gas station". Accordingly, the electronic device maps driving information of the "car keeping book" to the "gas station" category. Thereafter, if location information of the electronic device corresponding to the "gas station" category is detected, the electronic device may store the detected location information in the data storing unit to drive the "car keeping book" automatically.

In addition, the electronic device may determine a category including location information at a time point of performing an operation and determine the number of times the same operation is performed in the category during a reference period.

In addition, when there is a second operation previously mapped to a category, the electronic device may compare the number of times a first operation is performed in the category with the number of times the second operation is performed in the category and map the most performed operation to the category.

Therefore, the electronic device ends the algorithm of FIG. 4.

Figure 5:
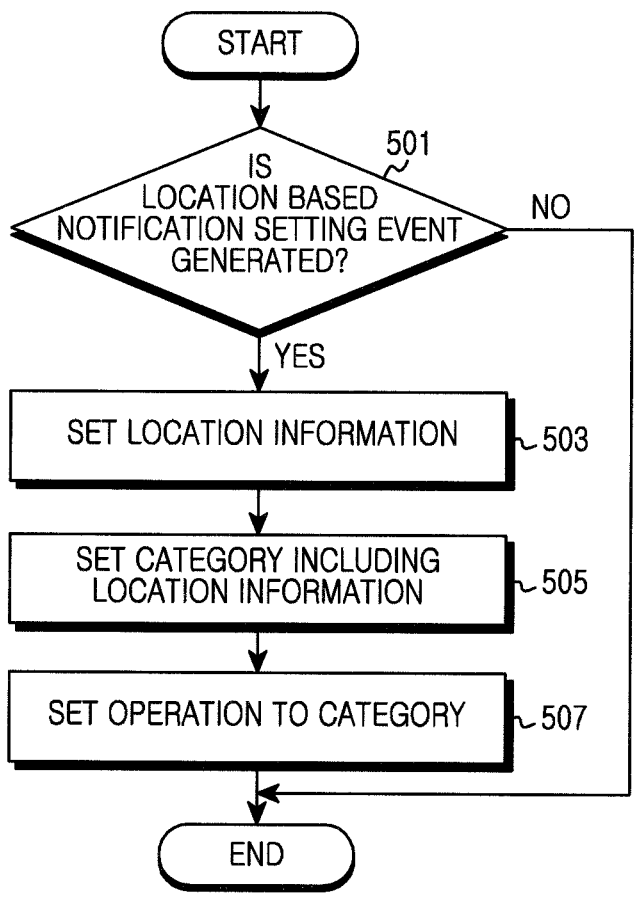
FIG. 5 is a flowchart illustrating a process of mapping an operation to a category including location information in an electronic device according to an embodiment of the present disclosure.

FIG. 5 is a flowchart illustrating a process of mapping an operation to a category including location information in an electronic device according to an embodiment of the present disclosure.

Referring to FIG. 5, the electronic device determines whether a location based notification setting event is generated in operation 501.

If it is determined in operation 501 that the location based notification setting event is generated, the electronic device proceeds to operation 503 and sets location information. For example, the electronic device sets location information for notification setting based on an address, a phone number, a coordinate (i.e., a latitude and a longitude), a title, and the like. Herein, it is assumed that the notification includes an event for executing an application program.

After setting the location, the electronic device proceeds to operation 505 and sets a category including the location information set in operation 503. For example, in the process of setting location information to a "CGG cinema", the electronic device sets a "movie theater" including the "CGG cinema" to a category. In another example, in the process of setting location information to an "ABC gas station", the electronic device may set a "gas station" including the "ABC gas station" to a category. In addition, the electronic device may generate a new category including the location information. In addition, although there is a category including the location information, the electronic device may change the category to a different category to include the location information in the different category.

After setting the category including the location information, the electronic device proceeds to operation 507 and sets an operation to the category set in operation 505. For example, the electronic device sets an "airplane mode" to the "movie theater" category. Thereafter, if location information corresponding to the "movie theater" category is detected, the electronic device stores the detected location information in a data storing unit to set the "airplane mode" automatically. In another example, the electronic device sets a "car keeping book" to the "gas station" category. Thereafter, if location information corresponding to the "gas station" category is detected, the electronic device may store the detected location information in the data storing unit to drive the "car keeping book" automatically.

Thereafter, the electronic device ends the algorithm of FIG. 5.

Figure 6A:
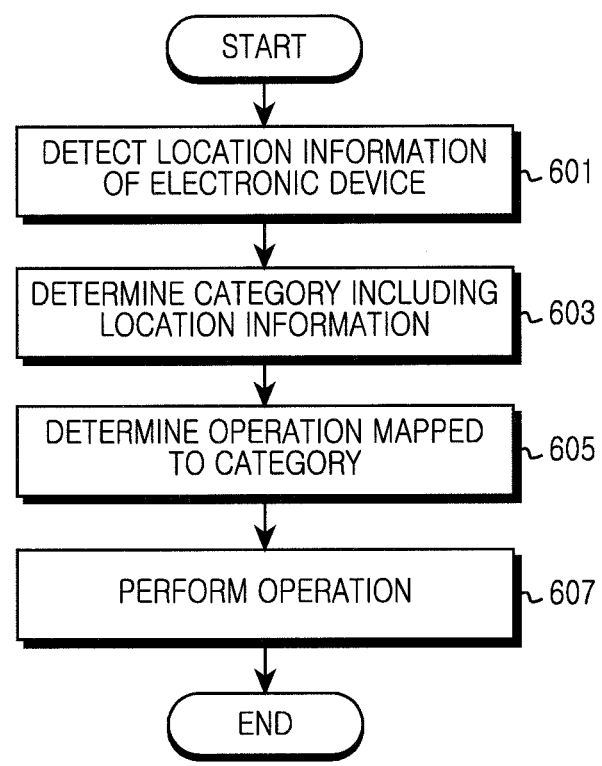
FIG. 6A is a flowchart illustrating a process of performing an operation corresponding to a category in an electronic device according to an embodiment of the present disclosure.

FIG. 6A is a flowchart illustrating a process of performing an operation corresponding to a category in an electronic device according to an embodiment of the present disclosure.

Referring to FIG. 6A, the electronic device detects its location information in operation 601. Herein, the electronic device determines its current location information using a GPS.

After detecting the location information of the electronic device, the electronic device proceeds to operation 603 and determines a category including the location information detected in operation 601. Herein, it is assumed that the category includes a plurality of location information having a similar characteristic. For example, when location information is a "CGG cinema", the electronic device may determine that a category of the "CGG cinema" is a "movie theater" using map data stored in a data storing unit. In another example, when location information is an "ABC gas station", the electronic device may determine that a category of the "ABC gas station" is a "gas station" using map data stored in the data storing unit.

After determining the category including the location information, the electronic device proceeds to operation 605 and determines an operation mapped to the category determined in operation 603. Herein, the operation may include all operations, which may be performed in the electronic device, such as control settings of the electronic device, execution of application programs, an initial mode when an application program is executed, and the like.

After determining the operation mapped to the category, the electronic device proceeds to operation 607 and performs the operation mapped to the category. For example, when setting information about an "airplane mode" is mapped to the "movie theater", the electronic device recognizes that the "airplane mode" is set in the "movie theater". Accordingly, the electronic device sets the "airplane mode". In another example, when driving information about a "car keeping book" is mapped to the "gas station", the electronic device recognizes that the "car keeping book" is driven in the "gas station". Accordingly, the electronic device may drive the "car keeping book".

In addition, when operations mapped to the category are a plurality of operations, the electronic device may perform an operation recently performed in the category among the plurality of operations.

In addition, when operations mapped to the category are a plurality of operations, the electronic device may perform an operation having the most number of times the operation is performed in the category among the plurality of operations.

In addition, when operations mapped to the category are a plurality of operations, the electronic device may perform an operation having the most number of times the operation is performed in the category during a reference period among the plurality of operations.

Thereafter, the electronic device ends the algorithm of FIG. 6A.

Figure 6B:
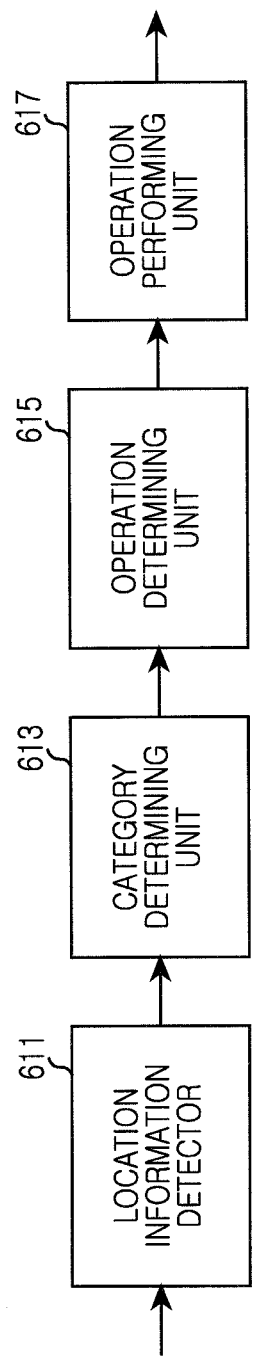
FIG. 6B is a block diagram illustrating a configuration of an electronic device for performing an operation corresponding to a category according to an embodiment of the present disclosure.

As described above, the process of providing the location based service in the electronic device may be configured as, as shown in FIG. 6B, an apparatus for providing the location based service in the electronic device.

FIG. 6B is a block diagram illustrating a configuration of an electronic device for performing an operation corresponding to a category according to an embodiment of the present disclosure.

Referring to FIG. 6B, the electronic device may include a location information detector, that is, a first unit 611 for detecting location information of the electronic device, a category determining unit, that is, a second unit 613 for determining a category including the location information, an operation determining unit, that is, a third unit 615 for determining an operation mapped to the category, and an operation performing unit, that is, a fourth unit 617 for performing the operation.

The first unit 611 detects location information of the electronic device. Herein, the first unit 611 determines current location information of the electronic device using a GPS.

The second unit 613 determines a category including the location information detected in the first unit 611. Herein, it is assumed that the category includes a plurality of location information having a similar characteristic. For example, when location information is a "CGG cinema", the second unit 613 may determine that a category of the "CGG cinema" is a "movie theater" using map data stored in a data storing unit. In another example, when location information is an "ABC gas station", the second unit 613 may determine that a category of the "ABC gas station" is a "gas station" using map data stored in the data storing unit.

The third unit 615 determines an operation mapped to the category determined in the second unit 613. Herein, the operation may include all operations, which may be performed in the electronic device, such as control settings of the electronic device, execution of application programs, an initial mode when an application program is executed, and the like.

The fourth unit 617 performs the operation mapped to the category determined in the third unit 615. For example, when setting information about an "airplane mode" is mapped to the "movie theater", the fourth unit 617 recognizes that the "airplane mode" is set in the "movie theater". Accordingly, the fourth unit 617 sets the "airplane mode". In another example, when driving information about a "car keeping book" is mapped to the "gas station", the fourth unit 617 recognizes that the "car keeping book" is driven in the "gas station". Accordingly, the fourth unit 617 may drive the "car keeping book".

In addition, when operations mapped to the category are a plurality of operations, the fourth unit 617 may perform an operation recently performed in the category among the plurality of operations.

In addition, when operations mapped to the category are a plurality of operations, the fourth unit 617 may perform an operation having the most number of times the operation is performed in the category among the plurality of operations.

In addition, when operations mapped to the category are a plurality of operations, the fourth unit 617 may perform an operation having the most number of times the operation is performed in the category during a reference period among the plurality of operations.

As described above, the electronic device may include a plurality of units for providing the location based service. The plurality of units for providing the location based service may be configured as one unit.

As described above, there is an advantage in that the electronic device may perform an operation mapped in the same category of the related art without additional setting or request when the user of the electronic device is located in a specific category by automatically performing an operation mapped to a category of detected location information when detecting the location information.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

Accordingly, various embodiments provide a program comprising codes for implementing an apparatus or a method as claimed in any one of the claims of this specification and a machine-readable storage storing such a program. Still further, such programs may be conveyed electronically via any medium, such as a communication signal carried, over a wired or a wireless connection and various embodiments suitably encompass the same.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for providing a location based service in an electronic device, the method comprising:
    detecting location information of the electronic device;
    identifying a category corresponding to the location information based on map data in the electronic device;
    determining an operation of a plurality of operations of the electronic device previously mapped to the category; and
    performing the operation of the electronic device,
    wherein the plurality of operations of the electronic device were previously mapped to the category based on at least one of a time when the operation has been performed or a number of times which the operation has been performed, and
    wherein the determining of the operation of the plurality of operations comprises determining the most recently performed operation of the plurality of operations or the most frequently performed operation of the plurality of operations.

2. The method of claim 1, wherein, when the determining of the operation of the plurality of operations comprises determining the most frequently performed operation of the plurality of operations, the determining of the operation comprises determining an operation having the most number of times the operation is performed in the category during a reference period.

3. The method of claim 1, further comprising:
    performing an operation;
    detecting location information of the electronic device;
    determining a category representing a type of the location information based on map data in the electronic device; and
    mapping the operation to the category.

4. The method of claim 3, wherein the mapping of the first operation comprises:
    determining a number of times which the operation is performed in the category; and
    mapping the operation to the category when the number of times which the operation is performed is greater than or equal to a reference number of times.

5. The method of claim 3, wherein the mapping of the operation comprises:
    determining a number of times which the operation is performed during a reference period in the category; and
    mapping the operation to the category when the number of times which the operation is performed in the category during the reference period in the category is greater than or equal to a reference number of times.

6. The method of claim 1, further comprising:
    detecting location information of the electronic device;
    determining a category representing a type of the location information based on map data in the electronic device; and
    mapping an operation of the electronic device to the category.

7. The method of claim 1, wherein the operation of the electronic device comprises at least one of control settings of the electronic device, execution of application programs, or an initial mode when an application program is executed.

8. An electronic device comprising:
    a memory; and
    at least one processor configured to:

detect location information of the electronic device,
identify a category corresponding to the location information based on map data in the memory,
determine an operation of a plurality of operations of the electronic device previously mapped to the category, and
perform the operation,
wherein the plurality of operations of the electronic device were previously mapped to the category based on at least one of a time when the operation has been performed or a number of times which the operation has been performed, and
wherein the determining of the operation of the plurality of operations comprises determining the most recently performed operation of the plurality of operations or the most frequently performed operation of the plurality of operations.

9. The electronic device of claim 8, wherein the at least one processor is further configured to, when the determining of the operation of the plurality of operations comprises determining the most frequently performed operation of the plurality of operations, determine an operation having the most number of times the operation is performed in the category during a reference period.

10. The electronic device of claim 8, wherein the at least one processor is further configured to:
perform an operation,
detect location information of the electronic device,
determine a category representing a type of the location information based on map data in the memory, and
map the operation to the category.

11. The electronic device of claim 10, wherein the at least one processor is further configured to determine a number of times which the operation is performed in the category and map the operation to the category when the number of times which the operation is performed is greater than or equal to a reference number of times.

12. The electronic device of claim 10, wherein the at least one processor is further configured to determine a number of times which the operation is performed during a reference period in the category and map the operation to the category when the number of times which the operation is performed in the category during the reference period in the category is greater than or equal to a reference number of times.

13. The electronic device of claim 8, wherein the at least one processor is further configured to:
detect location information of the electronic device,
determine a category representing a type of the location information based on map data in the electronic device, and
map an operation of the electronic device to the category.

14. The electronic device of claim 8, wherein the operation of the electronic device comprises at least one of control settings of the electronic device, execution of application programs, or an initial mode when an application mode is executed.

* * * * *